Nov. 13, 1951 — T. P. TANIS — 2,574,896

SUNGLASS FRAMES

Filed Nov. 18, 1948

Inventor
Thomas P. Tanis
By W.F.S. M. Stewart
Attorneys

UNITED STATES PATENT OFFICE 2,574,896

SUNGLASS FRAMES

Thomas P. Tanis, Philadelphia, Pa., assignor to Willson Products, Inc., Reading, Pa., a corporation of Pennsylvania Application November 18, 1948, Serial No. 60,705

1 Claim. (Cl. 2—14)

This invention relates to ophthalmic mountings, and more particularly, to a new and improved construction of eyeglasses, especially of the sunglass type, including a lens framing and lens structure of such configuration as to provide an attractive yet sturdy pair of glasses.

Heretofore, it was known in the art to provide lens framing of the "brow bar" type, which comprises framing encircling only the upper half portions of the lenses. However, this construction does not lend itself to simplicity in design or manufacture, particularly insofar as the nose piece is concerned—furthermore, the lower sharp edges of the lenses oftentimes come into contact with the wearer's cheek, causing discomfort. It is also well known to provide lens framing for eyeglasses including temples which are pivotally mounted at the lower side portions or at the central side portions of the framing, but in most cases, the framing completely surrounds the respective lenses. Such structure has the outstanding disadvantage in that it requires the use of separate lenses—also, these lenses are not easily mountable.

An object of the present invention is to provide a novel type of spectacles that is devoid of the above named disadvantages, and which is adapted for easy mounting of the lenses, also in which a lens of sheet form may be used as well as separate lenses.

A more specific object of this invention is to provide a novel type of lens framing for eyeglasses, particularly sunglasses, comprising the use of only lower half lens rims with no rim portions surrounding the upper half of the glasses, therefore enabling the use of a single lens sheet projecting upwardly above the top of the framing and adapted to cover both eyes of the wearer.

A still more specific object of this invention is to provide novel sunglasses having lens framing extending along only the lower halves of the rims of the lenses along which framing is provided with a continuous upper groove so that a single lens sheet correspondingly shaped may be slipped into and tightly fitted in the groove, the lens sheet extending across the face and covering both eyes of the wearer.

Other objects and advantages of this invention will become apparent from a study of the following specification taken with the accompanying drawing wherein.

Figure 1:
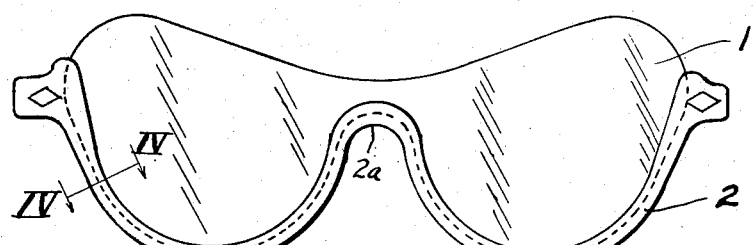
Fig. 1 is a front view of a pair of eyeglasses showing one embodiment of the present invention.

Referring more particularly to Fig. 1 of the drawing, numeral 1 denotes a single lens sheet fitted into and supported by lens framing 2. Lens sheet 1 may be of clear or dark glass or of plastic material—preferably it is of dark glass to provide sunglasses. Pivotally connected to the lens framing 2 are a pair of temples 3 and 4. The lens framing 2 is of somewhat sinuous shape and surrounds only the lower half of the lenses or lens sheet 1. A groove 5 is formed along the entire upper edge of the lens framing and into which may be slipped the lower rim portions of lens sheet 1. Any suitable bonding means may be employed for forming a tight fit between the lens framing and lens sheet. The lens framing includes a nose piece 2a and a pair of rests 2b, the latter adapted to rest on the wearer's nose to provide substantial comfort in the wearing of the glasses. The temples 3 and 4 are pivotally connected to the extremities of the lens framing 2 adjacent the central or near-top portion of the sides of the glasses.

Figure 2:
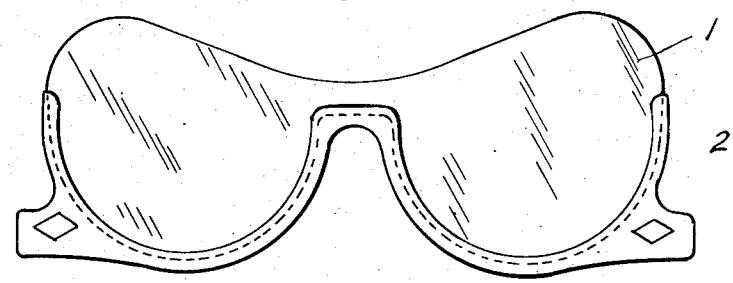
Fig. 2 is a front view of a modification having a slightly different type of lens framing wherein the temples are pivotally connected to the lower side portions of the framing, rather than to the upper side portions as shown in Fig. 1.
Figure 3:
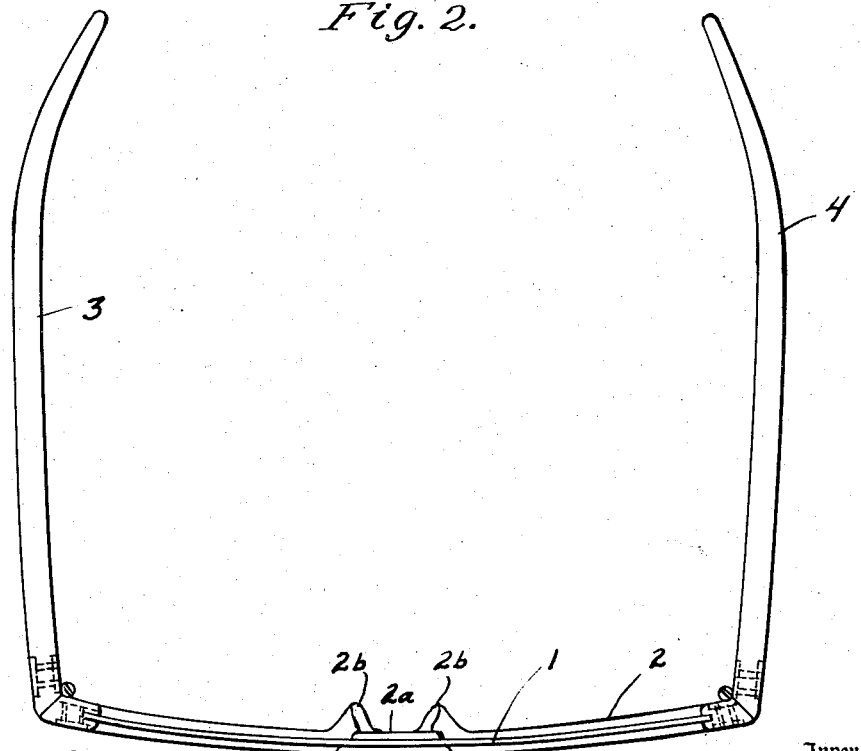
Fig. 3 is a top plan view of the lens framing shown in Fig. 1 or Fig. 2.
Figure 4:
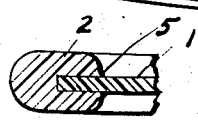
Fig. 4 is an enlarged cross-sectional view taken along line IV—IV of Fig. 1.

Fig. 2 shows a modification of the sunglasses shown in Fig. 1 wherein the temples are pivotally connected to the lower side portions of the framing instead of the upper side portions as shown in Fig. 1.

In both embodiments of the invention shown in Figs. 1 and 2, the lens sheet extends across the face of the wearer and projects upwardly from the top portions of the lens framing so as to cover both eyes. By elimination of the upper half of the lens framing, not only is one's vision improved in looking upwardly at objects, but there is provided a simple manner of attaching a single lens sheet to the lens framing, that is, merely by slipping the sheet into the grooves formed in the framing. Furthermore, the lens framing or rims which extend along only the lower half of the lens sheet, is a unitary piece, preferably of plastic, therefore providing rigidity and insuring alignment at all times of the lens halves—also, it provides a simple and graceful curvature for the nose piece which is not only attractive, but provides comfort in wearing.

Thus it will be seen that I have provided a novel, efficient and highly attractive pair of glasses, useful particularly as sunglasses, wherein the lens framing extends only along the lower half of the rims of the lenses, being completely omitted from the upper half, so as to provide great facility in attachment of the lenses to the frame, permitting the use of a single lens sheet for covering both eyes, and wherein such framing provides a rigid structure assuring alignment of the lenses, and which is simple and economical to manufacture as well as providing great comfort in wearing thereof, particularly since the nose piece is in the form of an integral portion of the lens framing, reversely curved with respect to the lens rim forming portions.

While I have illustrated and described certain specific embodiments of my invention, it will be apparent that these are by way of illustration only, and that various changes and modifications may be made within the contemplation of my invention and within the scope of the following claim.

I claim:

A pair of glasses comprising, in combination, a single plastic lens sheet shaped in the form of two lens portions having upper and lower rim portions joined by an integral bridging portion, a one piece plastic framing substantially in the form of two semi-circles joined by an integral, reversely bent nose-piece forming portion, said lens framing having a grooved upper edge throughout the entire length thereof shaped to fit the lower rim portion of said lens portions and said nose piece forming portion respectively, said upper rim portions being devoid of framing, said groove holding said lens sheet in position, said reversely bent portion of the framing having spaced rearwardly extending integral pieces shaped to fit the nose, said lens framing terminating in integral, laterally extending ear portions, and a pair of temples pivotally mounted to said ear portions of said lens framing, thereby providing a two-piece assembly wherein only the lower halves of the lens portions are encircled by the lens framing, the upper halves being devoid of framing, hence enhancing the vision of the wearer.

THOMAS P. TANIS.

REFERENCES CITED

The following references are of record in the file of this patent:

UNITED STATES PATENTS

| Number | Name | Date |
| --- | --- | --- |
| D. 150,639 | McNeil | Aug. 17, 1948 |
| 1,310,077 | Heaford | July 15, 1919 |
| 1,335,517 | Mayerle | Mar. 30, 1920 |
| 1,825,503 | Carow | Sept. 29, 1931 |
| 1,986,688 | Thiele | Jan. 1, 1935 |
| 2,284,630 | Banks | June 2, 1942 |
| 2,359,435 | Miller | Oct. 3, 1944 |
| 2,362,002 | Gluck | Nov. 7, 1944 |
| 2,374,171 | Brenker | Apr. 24, 1945 |
| 2,382,962 | Courtney | Aug. 21, 1945 |
| 2,389,742 | Rey | Nov. 27, 1945 |
| 2,444,498 | Cochran | July 6, 1948 |
| 2,482,144 | Allen | Sept. 20, 1949 |